US009997072B2

(12) United States Patent
Hu

(10) Patent No.: US 9,997,072 B2
(45) Date of Patent: Jun. 12, 2018

(54) DRIVING ASSISTANCE APPARATUS

(71) Applicant: DENSO CORPORATION, Kariya, Aichi-pref. (JP)

(72) Inventor: Jian Hu, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days. days.

(21) Appl. No.: 15/408,841

(22) Filed: Jan. 18, 2017

(65) Prior Publication Data

US 2017/0206788 A1 Jul. 20, 2017

(30) Foreign Application Priority Data

Jan. 18, 2016 (JP) ................................ 2016-007105

(51) Int. Cl.
*B60Q 1/00* (2006.01)
*G08G 1/16* (2006.01)
*G08G 1/01* (2006.01)

(52) U.S. Cl.
CPC ........... *G08G 1/162* (2013.01); *G08G 1/0145* (2013.01)

(58) Field of Classification Search
CPC .......... G08G 1/16; G08G 1/161; G08G 1/166; G08G 1/162; G08G 1/0145; G01S 13/931; B60W 30/16; B60K 31/0008; B60Q 1/525
USPC ............... 340/435, 901, 903, 905, 933, 934; 701/300, 301, 400, 96
See application file for complete search history.

(56) References Cited

U.S. PATENT DOCUMENTS

2009/0147996 A1* 6/2009 Peng ........................ G01C 3/32 382/106
2014/0222280 A1* 8/2014 Salomonsson ......... G08G 1/167 701/1
2015/0206430 A1* 7/2015 Yang ...................... G08G 1/166 340/435

FOREIGN PATENT DOCUMENTS

JP 5607135 B 10/2014

* cited by examiner

*Primary Examiner* — Thomas Mullen
(74) *Attorney, Agent, or Firm* — Knobbe, Martens, Olson & Bear, LLP

(57) ABSTRACT

In a driving assistance apparatus, a detector is configured to detect whether or not a leading vehicle has started moving, where the leading vehicle is a vehicle just in front of an own vehicle and the own vehicle is a vehicle carrying the apparatus. A notifier is configured to, if it is detected by the detector that the leading vehicle has started moving, provide a notification that the leading vehicle has started moving. An inhibitor is configured to, when the own vehicle has approached a stop point along a road, at which every vehicle must stop before passing therethrough, inhibit the notifier from providing the notification that the leading vehicle has started moving.

5 Claims, 6 Drawing Sheets

DRIVING ASSISTANCE APPARATUS

CROSS-REFERENCE TO RELATED APPLICATION

This application is based on and claims the benefit of priority from earlier Japanese Patent Applications No. 2016-7105 filed Jan. 18, 2016, the description of which is incorporated herein by reference.

BACKGROUND

Technical Field

The present invention relates to a technique for providing a notification that a leading vehicle in front of an own vehicle has started moving.

Related Art

A known apparatus, as disclosed in Japanese Patent No. 5607135, is configured to, if a distance between a vehicle carrying the apparatus (hereinafter referred to as an own vehicle) and a leading vehicle in front of the own vehicle increases to above a predetermined threshold while the own vehicle is stationary, provide a notification that the leading vehicle has started moving.

However, a situation may be envisioned that, when a plurality of vehicles are queuing up prior to a stop point at which every vehicle must stop, the own vehicle queues up behind these queuing vehicles. In such a situation, a leading vehicle in front of the own vehicle may frequently stop and start moving until the own vehicle passes through the stop point. Therefore, the above known apparatus may frequently provide the notification that the leading vehicle has started moving, which may cause a driver of the own vehicle to feel annoyance.

In consideration of the foregoing, exemplary embodiments of the present invention are directed to providing a technique for properly providing a notification that a leading vehicle has started moving.

SUMMARY

In accordance with an exemplary embodiment of the present invention, there is provided a driving assistance apparatus including: a detector configured to detect whether or not a leading vehicle has started moving, the leading vehicle being a vehicle just in front of an own vehicle, the own vehicle being a vehicle carrying the apparatus; a notifier configured to, if it is detected by the detector that the leading vehicle has started moving, provide a notification that the leading vehicle has started moving; and an inhibitor configured to, when the own vehicle has approached a stop point along a road, at which every vehicle must stop before passing therethrough, inhibit the notifier from providing the notification that the leading vehicle has started moving.

A situation may be envisioned that, when the own vehicle is passing through a stop point, the own vehicle queues up behind a plurality of vehicles queuing up prior to the same stop point. These queuing vehicles will pass through the stop point in order after stopping at the stop point. The own vehicle moves toward the stop point following these queuing vehicles. Therefore, the leading vehicle that is one of the queuing vehicles, just in front of the own vehicle, frequently stops and starts moving until the own vehicle passing through the stop point, which may cause the notification that the leading vehicle has started moving to be frequently generated. This may cause a driver of the own vehicle to feel annoyance.

The driving assistance apparatus configured as above is able to, when the own vehicle has approached a stop point, inhibit the notification that the leading vehicle has started moving. Therefore, regardless of whether or not a plurality of vehicles are queuing up prior to the stop point, the stop point is deemed as a point that may cause such a notification to be frequently generated. The driving assistance apparatus configured as above can inhibit such a notification from being frequently generated. This can prevent the driver of the own vehicle from feeling annoyance, and thus can properly provide the notification to the driver of the own vehicle that the leading vehicle has started moving.

DESCRIPTION OF SPECIFIC EMBODIMENTS

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

1. First Embodiment 1-1. System Configuration

Figure 1A:
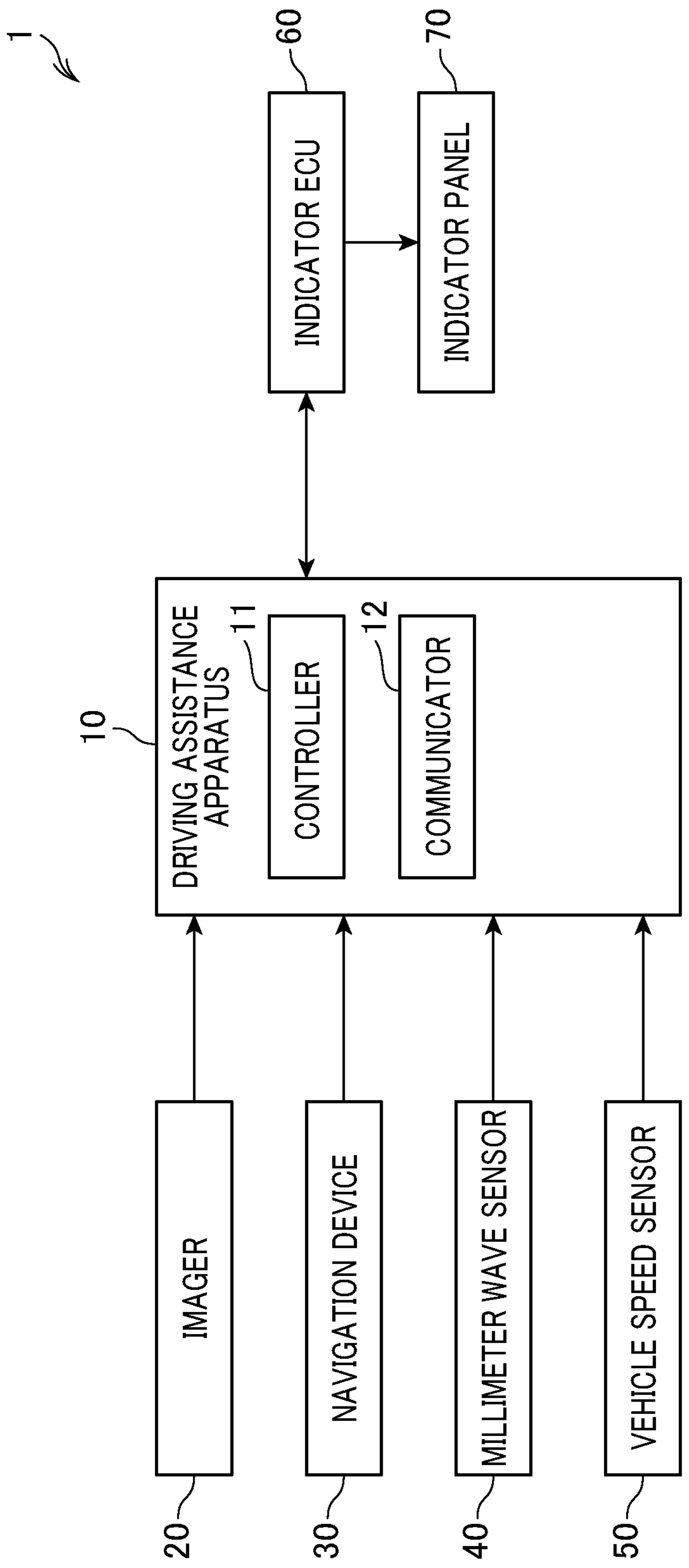
FIG. 1A is a block diagram of a vehicle-mounted system in accordance with a first embodiment of the present invention.

A vehicle-mounted system 1 in accordance with a first embodiment of the present invention, as shown in FIG. 1, is configured to, while a vehicle carrying the system 1 (hereinafter referred to as an own vehicle) is stationary, provide a notification to a driver and other passengers of the own vehicle that a leading vehicle has started moving in a forward direction of the own vehicle. As used herein, the leading vehicle is a vehicle just in front of the own vehicle. Such notification is hereinafter referred to as leading vehicle notification (LVN). The vehicle-mounted system 1 includes a driving assistance apparatus 10, an imager 20, a navigation device 30, a millimeter wave sensor 40, and a vehicle speed sensor 50, and an indicator control electronic control unit (ECU) 60.

The driving assistance apparatus 10 includes a controller 11 and a communication unit 12. The controller 11 may be configured as a microcomputer including a central processing unit (CPU), a read-only memory (ROM), a random-access memory (RAM), an input-output interface, and other components. Various functions of the controller 11 to control various elements of the driving assistance apparatus 10 may be implemented by the CPU executing computer programs stored in the ROM or loaded to the RAM, or may be realized not only in software, but also in hardware, for example, in logic circuitry, analog circuitry, or combinations thereof.

The communication unit 12 is configured to communicate with other devices mounted in the own vehicle via an in-vehicle local area network (not shown). The imager 20 is configured to capture an image looking in the forward direction of the own vehicle every predetermined time interval to output a video signal of the captured image to the driving assistance apparatus 10. In another embodiment, the imager 20 may be a stereoscopic camera, where a distance between the own vehicle and an object in front of the own vehicle can be measured based on images captured by the stereoscopic camera.

The navigation device 30 is configured to detect a location of the own vehicle using a satellite positioning system, such as a global positioning system (GPS), and map data. The location of the own vehicle may be used in route guidance, facility search, and various driving assistance. The navigation device 30 and the driving assistance apparatus 10 may be connected to each other via the in-vehicle local area network.

The millimeter wave sensor 40 is configured to, based on reflections of millimeter waves irradiated in the forward direction of the own vehicle, detect a positional relationship between the own vehicle and an object ahead of the own vehicle and/or a shape of the object, and provide a detection result to the driving assistance apparatus 10. The millimeter wave sensor 40 may be replaced with a laser radar to detect a positional relationship between the own vehicle and an object ahead of the own vehicle. The millimeter wave sensor 40 may be provided in a device connected to the driving assistance apparatus 10 via the in-vehicle local area network or the like to transmit the detection result to the driving assistance apparatus 10.

The vehicle speed sensor 50 is configured to detect a travel speed of the own vehicle. The driving assistance apparatus 10 is configured to detect the travel speed of the own vehicle based on a signal from the vehicle speed sensor 50. The vehicle speed sensor 50 may be provided in a device connected to the driving assistance apparatus 10 via the in-vehicle local area network to transmit the travel speed detected by the vehicle speed sensor 50 to the driving assistance apparatus 10.

The indicator ECU 60 is configured to display a state of the own vehicle, such as the travel speed of the own vehicle, on an indicator panel 70. The indicator ECU 60 and the driving assistance apparatus 10 may be connected to each other via the in-vehicle local area network.

1-2. Processing

The vehicle-mounted system 1 of the present embodiment is configured to, if a distance between the own vehicle and a leading vehicle in front of the own vehicle increases to above a predetermined threshold X while the own vehicle is stationary, perform the leading vehicle notification (LVN) to provide a notification to a driver of the own vehicle that the leading vehicle has started moving. However, stop points, at each of which every vehicle must stop before passing therethrough, are provided along a road, as shown in FIG. 1C. The stop points may include intersections, railroad crossings and others that every vehicle is mandated to stop at. When the own vehicle passes through such a stop point, the notification that the leading vehicle has started moving may be generated frequently, which may cause a driver of the own vehicle to feel annoyance.

A situation may be envisioned that, when the own vehicle is passing through a stop point as defined as above, a plurality of vehicles that intend to pass through the same stop point (hereinafter referred to as queuing vehicles) are queuing up toward and prior to the same stop point. In such a situation, the own vehicle queues up behind these queuing vehicles. These queuing vehicles will pass through the stop point in order after stopping at the stop point. The own vehicle moves toward the stop point following these queuing vehicles. Therefore, the leading vehicle that is one of the queuing vehicles frequently stops and starts moving until the own vehicle passing through the stop point, which may cause the LVN to be frequently generated.

In the present embodiment, the vehicle-mounted system 1 is configured to, when the own vehicle has approached a stop point, inhibit the LVN to reduce the notification frequency, which can prevent the driver of the own vehicle from feeling annoyance. Processing to be performed in the vehicle-mounted system 1 will now be described in detail.

(1) LVN Inhibition Processing

Figure 2:
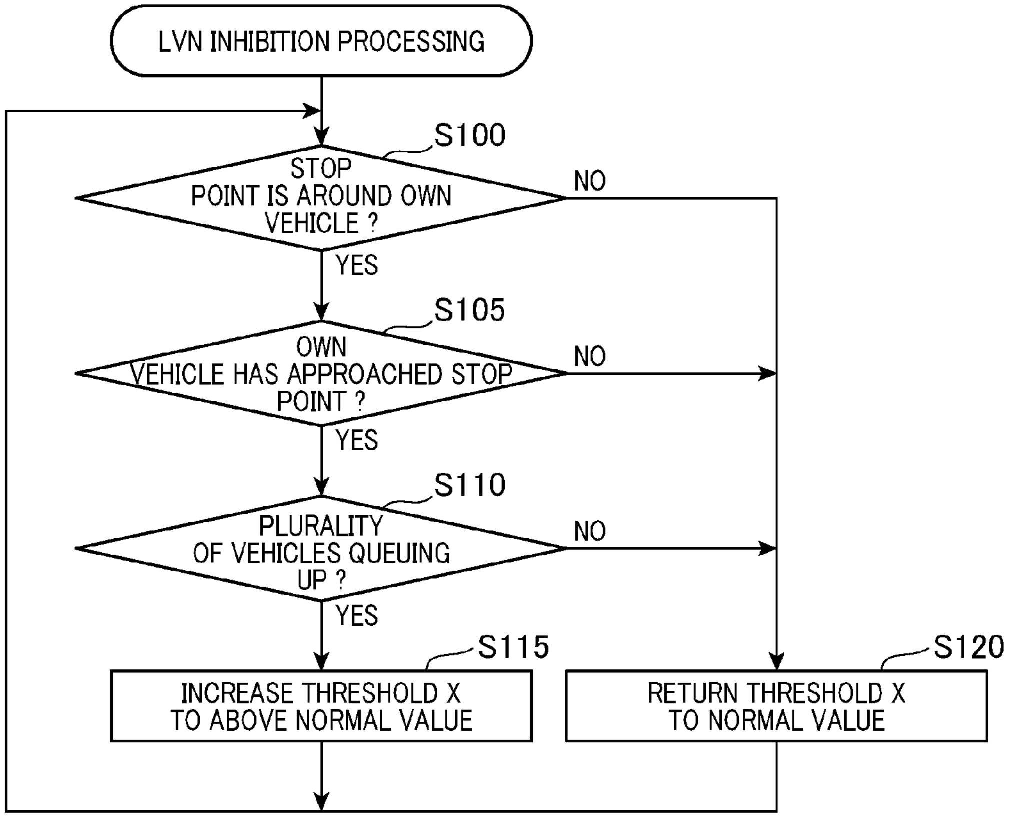
FIG. 2 is a flowchart of LVN inhibition processing of the first embodiment.

LVN inhibition processing for inhibiting the LVN when the own vehicle has approached a stop point will now be described with reference to a flowchart of FIG. 2. The LVN inhibition processing is mainly performed in the driving assistance apparatus 10 of the vehicle-mounted system 1. The LVN inhibition processing is initiated upon start-up of the own vehicle.

In step S100, the controller 11 of the driving assistance apparatus 10 determines whether or not there is a stop point around the own vehicle. If in step S100 it is determined that there is a stop point around the own vehicle, then the process flow proceeds to step S105. Otherwise, the process flow proceeds to step S120.

More specifically, the controller 11 may be configured to, based on captured images from the imager 20, recognize a stop sign, a stop marking, or a railroad crossing that is present ahead of the own vehicle. The stop sign and the stop marking are indicators that instruct vehicles to stop. The controller 11 may be configured to, based on the recognition result, determine the presence or absence of a stop point around the own vehicle. In an alternative embodiment, the navigation device 30 may be configured to, based on the map data and the location of the own-vehicle, determine the presence or absence of a stop point around the own vehicle, where the controller 11 may acquire the determination result from the navigation device 30.

In step S105, the controller 11 determines whether or not the own vehicle has approached the stop point. If in step S105 it is determined that the own vehicle has approached the stop point, then the process flow proceeds to step S110. Otherwise, the process flow proceeds to step S120.

More specifically, for example, in the case of the imager 20 being a stereoscopic camera, the controller 11 may be configured to, based on captured images from the imager 20, determine a distance between the stop point located ahead of the own vehicle and indicated by a road sign or the like and the own vehicle. If the distance between the stop point and the own vehicle decreases to below a predetermined threshold, it may be determined that the own vehicle has approached the stop point.

Still alternatively, the navigation device 30 may be configured to, based on the map data, the location of the own vehicle and a travel route of the own vehicle, determine a distance between the stop point located ahead of the own vehicle and the own vehicle, where the controller 11 may acquire the determination result from the navigation device 30 every predetermined time interval. The controller 11 may be configured to, if the distance between the stop point and the own vehicle decreases to below a predetermined threshold, determine that the own vehicle has approached the stop point. The predetermined threshold may be set equal to or less than 50 m.

In step S110, the controller 11 determines whether or not a plurality of vehicles that intend to pass though the stop point that the own vehicle has approached are queuing up toward the same stop point. That is, the controller 11 determines whether or not a plurality of vehicles are queuing up toward and prior to the stop point that the own vehicle has approached. More specifically, the controller 11 may be configured to, using captured images from the imager 20, count the number of vehicles queuing up prior to the stop point, and based on the queuing vehicle count, determine whether or not a plurality of vehicles are queuing up toward and prior to the stop point. In an alternative embodiment, the controller 11 may be configured to, using the millimeter wave sensor, detect vehicles queuing up toward the stop point, and based on the detection result, count the number of queuing vehicles. The controller 11 may then be configured to, based on the queuing vehicle count, determine whether or not whether or not a plurality of vehicles are queuing up toward and prior to the stop point.

If in step S110 it is determined that a plurality of vehicles are queuing up prior to the stop point, the process flow proceeds to step S115. If in step S110 it is determined that less than two vehicles are present prior to the stop point, then the process flow proceeds to step S120.

In step S115, the controller 11 increases the threshold X to above a normal value, then the process flow proceeds to step S100. In an alternative embodiment, the controller 11 may be configured to, instead of increasing the threshold X, prohibit the LVN.

In step S120, the controller 11 returns the threshold X to the normal value, and then the process flow proceeds to step S100. The threshold X may be set within a range of about 2-8 m. In the alternative embodiment where in step 115 the notification is prohibited, the controller 11 may be configured to, in step S120, permit the LVN.

(2) LVN Processing

Figure 3:
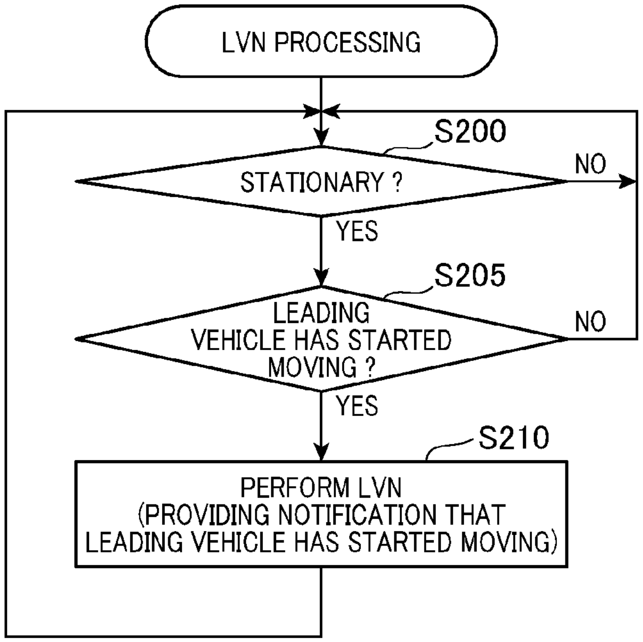
FIG. 3 is a flowchart of LVN processing of the first embodiment.

LVN processing for providing a notification to the driver of the own vehicle that the leading vehicle has started moving will now be described with reference to a flowchart of FIG. 3. The LVN processing is mainly performed in the driving assistance apparatus 10 of the vehicle-mounted system 1. The LVN processing is initiated upon start-up of the own vehicle.

In step S200, the controller 11 of the driving assistance apparatus 10 determines whether or not the own vehicle is stationary. More specifically, the controller 11 may be configured to, based on the travel speed of the own vehicle detected by the vehicle speed sensor 50, determine whether or not the own vehicle is stationary. If in step S200 it is determined that the own vehicle is stationary, then the process flow proceeds to step S205. Otherwise, the process flow proceeds to step S200. In an alternative embodiment, the controller 11 may be configured, if the own vehicle is traveling at a low speed, the process flow proceeds to step S205.

In step S205, the controller 11 detects whether or not the leading vehicle has started moving based on a distance between the own vehicle and the leading vehicle. More specifically, the threshold X is set greater than a threshold Y (i.e., X>Y). The controller 11 may be configured to, if the distance between the own vehicle and the leading vehicle increases from below the threshold Y to above the threshold X, determine that the leading vehicle has started moving. In an alternative embodiment where the imager 20 is a stereoscopic camera, the controller 11 may be configured to determine the distance between the own vehicle and the leading vehicle based on captured images from the imager 20. In an alternative embodiment, the controller 11 may be configured to determine the distance between the own vehicle and the leading vehicle based on a detection result of the millimeter wave sensor 40. If in step S205 it is determined that the leading vehicle has started moving, then the process flow proceeds to step S210. Otherwise, the process flow proceeds to step S200.

In step S210, the controller 11 performs the LVN to notify the driver of the own vehicle that the leading vehicle has started moving via either or both of visual and auditory senses. Thereafter, the process flow proceeds to step S200. More specifically, for example, the controller 11 may be configured to communicate with the indicator ECU 60 to instruct the indicator ECU 60 to display on the indicator panel 70 that the leading vehicle has started moving. In an alternative embodiment, the controller 11 may be configured to communicate with the navigation device 30 to instruct the navigation device 30 to provide a notification that the leading vehicle has started moving via either or both of visual means and audio means. For example, the controller 11 may be configured to provide a notification that the leading vehicle has started moving via either or both of a speaker and a buzzer (not shown). If the LVN is prohibited in step S115 of the LVN inhibition processing, the controller 11 does not perform the LVN in step S210.

Figure 1B:
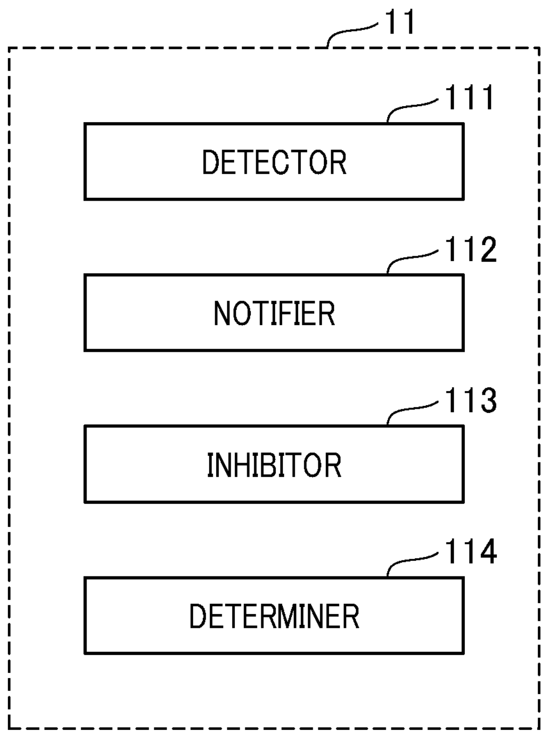
FIG. 1B is a functional block diagram of a controller of the system.
Figure 1C:
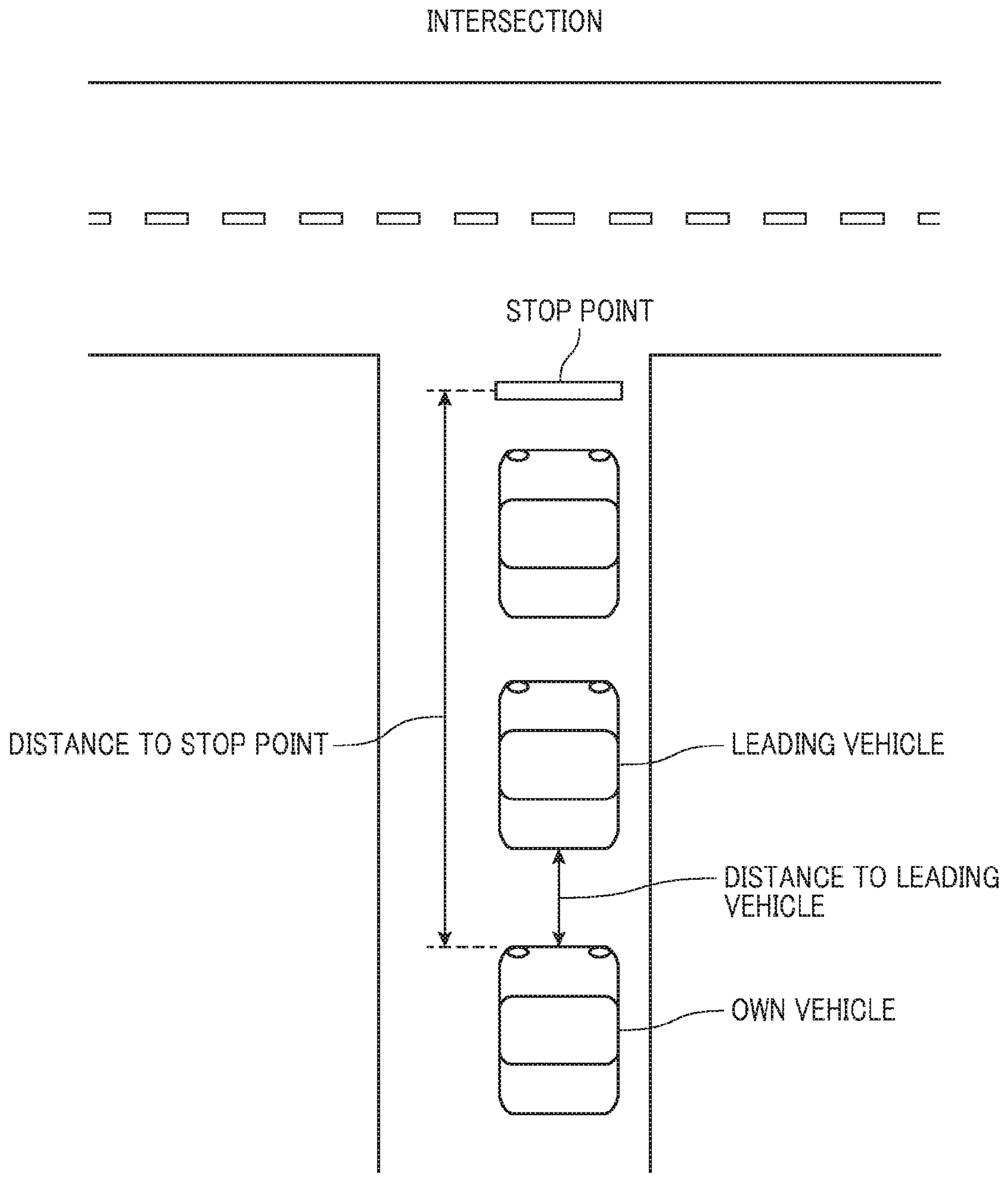
FIG. 1C illustrates a leading vehicle and an own vehicle on a road and at a stop point.

FIG. 1B illustrates a functional block diagram of the controller 11 of the vehicle-mounted system 1. The vehicle-mounted system 1 corresponds to a driving assistance apparatus. The controller 11 includes a detector 111 responsible for execution of step S205, a notifier 112 responsible for execution of step S210, an inhibitor 113 responsible for execution of step S115, and a determiner 114 responsible for execution of step S110.

1-3. Advantages

The present embodiment described as above can provide the following advantages.

(A1) In the first embodiment, when the own vehicle has approached a stop point, the LVN is inhibited. In a situation where, when the own vehicle is passing through a stop point, a plurality of vehicles that intend to pass through the same stop point are queuing up prior to the same stop point, this configuration can avoid the LVN from being frequently generated, which can prevent the driver of the own vehicle from feeling annoyance, thus allowing the LVN to be properly performed.

(A2) In the first embodiment, if a distance between the own vehicle and a leading vehicle in front of the own vehicle increases to above a predetermined threshold X, it is deemed that the leading vehicle has started moving. In addition, when the own vehicle has approached a stop point, the threshold X is increased to above a normal value. This configuration can reliably inhibit the LVN when the own vehicle has approached the stop point.

(A3) In the first embodiment, in step S115 of the LVN inhibition processing, the LVN may be prohibited instead of increasing the predetermined threshold X. This configuration can also reliably inhibit the LVN when the own vehicle has approached the stop point.

(A4) In the first embodiment, if a plurality of vehicles are queuing up prior to the stop point that the own vehicle has approached, the LVN is inhibited. Therefore, this configuration can prevent the LVN only if the LVN is likely to be frequently generated, which can ensure the LVN is properly performed.

2. Second Embodiment 2-1. Differences from First Embodiment

A second embodiment will now be described. The essential configuration of the second embodiment is similar to that of the first embodiment. Therefore, only differences of the second embodiment from the first embodiment will be described and no description about the common configuration between the first and second embodiments is not provided in order to avoid repetitions. Elements having the same functions as those in the first embodiment are assigned the same numbers.

The vehicle-mounted system 1 of the second embodiment is similar in configuration to the vehicle-mounted system 1 of the first embodiment. As to a difference between the first and second embodiments, in the vehicle-mounted system 1 of the first embodiment, the LVN is performed when it is detected that the leading vehicle has started moving. When the own vehicle has approached a stop point, then the threshold X used to detect whether or not the leading vehicle has started moving is increased, thereby inhibiting the LVN.

To this, in the vehicle-mounted system 1 of the second embodiment, the LVN is performed when a predetermined wait time has elapsed after it is detected that the leading vehicle has started moving. If the own vehicle is located proximate to the stop point, the wait time is increased, thereby inhibiting the LVN.

2-2. Processing

Figure 4A:
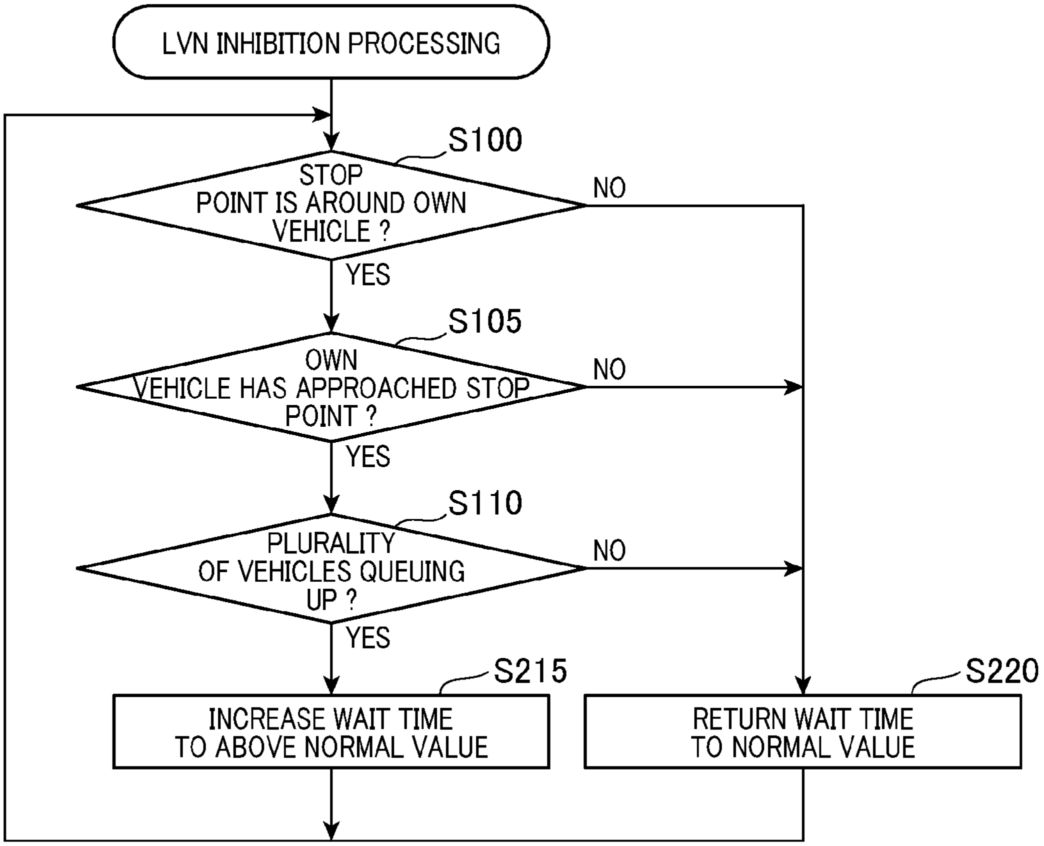
FIG. 4A is a flowchart of LVN inhibition processing in accordance with a second embodiment.

Processing to be performed in the vehicle-mounted system 1 of the second embodiment will now be described with reference to FIG. 4A.

(1) LVN Inhibition Processing

The LVN inhibition processing of the second embodiment is similar to that of the first embodiment, except that steps S215, S220 are respectively different from steps S115, S120 of the first embodiment.

In step S215, the controller 11 of the driving assistance apparatus 10 increases a wait time to above a normal value. The LVN is performed when a predetermined wait time has elapsed after it is detected that the leading vehicle has started moving. Thereafter, the process flow proceeds to step S100. In an alternative embodiment, the controller 11 may be configured to, instead of increasing the wait time, prohibit the LVN.

In step S220, the controller 11 returns the wait time to the nominal value. Thereafter, the process flow proceeds to step S100. Alternatively, if in step S215 the LVN is prohibited, the controller 11 may be configured to, in step S220, permit the LVN.

(2) LVN Processing

Figure 4B:
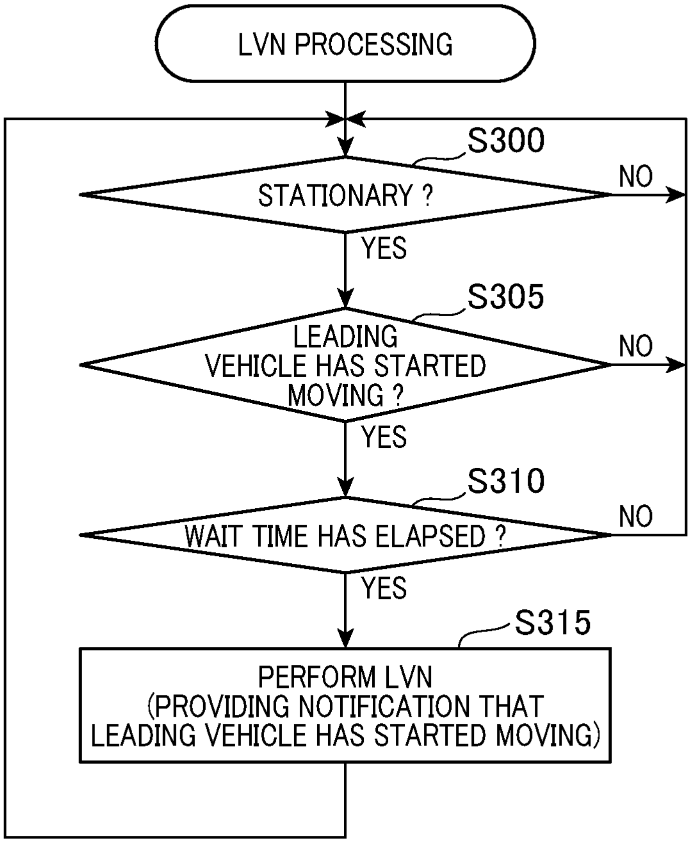
FIG. 4B is a flowchart of LVN processing of the second embodiment.

The LVN processing in accordance with the second embodiment will now be described with reference to flowchart of FIG. 4B. The LVN processing is mainly performed in the driving assistance apparatus 10 of the vehicle-mounted system 1. The LVN processing is initiated upon start-up of the own vehicle.

In step S300, as in step S200 of the LVN processing of the first embodiment, the controller 11 of the driving assistance apparatus 10 determines whether or not the own vehicle is stationary. If in step S300 it is determined that the own vehicle is stationary, then the process flow proceeds to step S305. Otherwise, the process flow proceeds to step S300.

In step S305, as in step S205 of the LVN processing of the first embodiment, the controller 11 detects whether or not the leading vehicle has started moving. If in step S305 it is determined that the leading vehicle has started moving, then the process flow proceeds to step S310. Otherwise, the process flow proceeds to step S300.

In step S310, the controller 11 determines whether or not the wait time has elapsed after the leading vehicle has started moving. If it is determined that the wait time has elapsed after the leading vehicle has started moving, then the process flow proceeds to step S315. Otherwise, the process flow proceeds to step S300.

A situation may be envisioned that the own vehicle starts moving prior to the wait time having elapsed after the leading vehicle has started moving. In such a situation, the state where it is detected that the leading vehicle has started moving may be removed, and the wait time count may be reset.

In step S315, as in step S210 of the LVN processing of the first embodiment, the controller 11 performs the LVN to provide a notification that the leading vehicle has started. Thereafter, the process flow proceeds to step S300.

FIG. 1B illustrates a functional block diagram of the controller 11 of the vehicle-mounted system 1. The vehicle-mounted system 1 corresponds to a driving assistance apparatus. In the controller 11, the detector 111 is responsible for execution of step S305, the notifier 112 is responsible for execution of step S315, the inhibitor 113 is responsible for execution of step S215, and the determiner 114 responsible for execution of step S110.

2-3. Advantages

The second embodiment can provide the following advantage in addition to the advantages of the first embodiment (A1), (A3) and (A4).

That is, in the second embodiment, when the wait time has elapsed after it is detected that the leading vehicle has started moving, the LVN is performed to provide a notification that the leading vehicle has started. When the own vehicle has approached a stop point, the wait time is increased to above the normal value. This configuration can reliably inhibit the LVN when the own vehicle has approached a stop point.

3. Modifications

It is to be understood that the invention is not to be limited to the specific embodiments disclosed above and that modifications and other embodiments are intended to be included within the scope of the appended claims.

(M1) In each of the first and second embodiments, if the distance between the own vehicle and the leading vehicle increases to above the threshold X, it is deemed that the leading vehicle has started moving. Alternatively, the vehicle-mounted system 1 may be configured to measure a travel speed of the leading vehicle relative to the own vehicle in the forward direction of the own vehicle. If the relative speed of the leading vehicle exceeds a predetermined threshold Z, then it is deemed that the leading vehicle has started moving. In such an alternative embodiment, the LVN may be inhibited by increasing the threshold Z to above a normal value.

(M2) In each of the first and second embodiments, if a plurality of vehicles are queuing up prior to a stop point that the own vehicle has approached, the LVN is inhibited. Alternatively, regardless of whether or not a plurality of vehicles are queuing up prior to a stop point that the own vehicle has approached, the LVN may be inhibited.

(M3) The functions of a single component may be distributed to a plurality of components, or the functions of a plurality of components may be integrated into a single component. At least part of the configuration of the above embodiments may be replaced with a known configuration having a similar function. At least part of the configuration of the above embodiments may be removed. At least part of the configuration of one of the above embodiments may be replaced with or added to the configuration of another one of the above embodiments. While only certain features of the invention have been illustrated and described herein, many modifications and changes will occur to those skilled in the art. It is, therefore, to be understood that the appended claims are intended to cover all such modifications and changes as falling within the true spirit of the invention.

(M4) It should be appreciated that the present invention is not to be limited to the vehicle-mounted systems 1 disclosed above and that the present invention can be implemented in numerous ways, including a single vehicle-mounted device corresponding to any one of the vehicle-mounted systems disclosed above, a program for enabling a computer to function as any one of the vehicle-mounted systems disclosed above, a non-transitory computer readable storage medium storing such a program, and a method corresponding to the LVN processing disclosed above.

What is claimed is:

1. A driving assistance apparatus comprising:

a detector configured to detect whether or not a leading vehicle has started moving, the leading vehicle being a vehicle just in front of an own vehicle, the own vehicle being a vehicle carrying the apparatus;

a notifier configured to, if it is detected by the detector that the leading vehicle has started moving, provide a notification that the leading vehicle has started moving; and an inhibitor configured to, when the own vehicle has approached a stop point along a road, at which every vehicle must stop before passing therethrough, inhibit the notifier from providing the notification that the leading vehicle has started moving.

2. The apparatus according to claim 1, wherein the detector is configured to, if a distance between the own vehicle and the leading vehicle increases to above a predetermined threshold, detect that the leading vehicle has started moving, and the inhibitor is configured to inhibit the notifier from providing the notification that the leading vehicle has started moving by increasing the threshold.

3. The apparatus according to claim 1, wherein the notifier is configured to, when a predetermined wait time has elapsed after it is determined by the detector that the leading vehicle has started moving, provide the notification that the leading vehicle has started moving, and the inhibitor is configured to inhibit the notifier from the providing the notification that the leading vehicle has started moving by increasing the wait time.

4. The apparatus according to claim 1, wherein the inhibitor is configured to inhibit the notifier from the providing the notification that the leading vehicle has started moving.

5. The apparatus according to claim 1, further comprising a determiner configured to determine whether or not a plurality of vehicles that intend to pass through the stop point that the own vehicle has approached are queuing up toward and prior to the same stop point, wherein the inhibitor is configured to, if it is determined by the determiner that a plurality of vehicles that intend to pass through the stop point that the own vehicle has approached are queuing up toward and prior to the same stop point, inhibit the notifier from providing the notification that the leading vehicle has started moving.

* * * * *